July 25, 1967  E. W. SWENSON ETAL  3,332,691
SPREADER APPARATUS
Filed Nov. 18, 1964  3 Sheets-Sheet 3
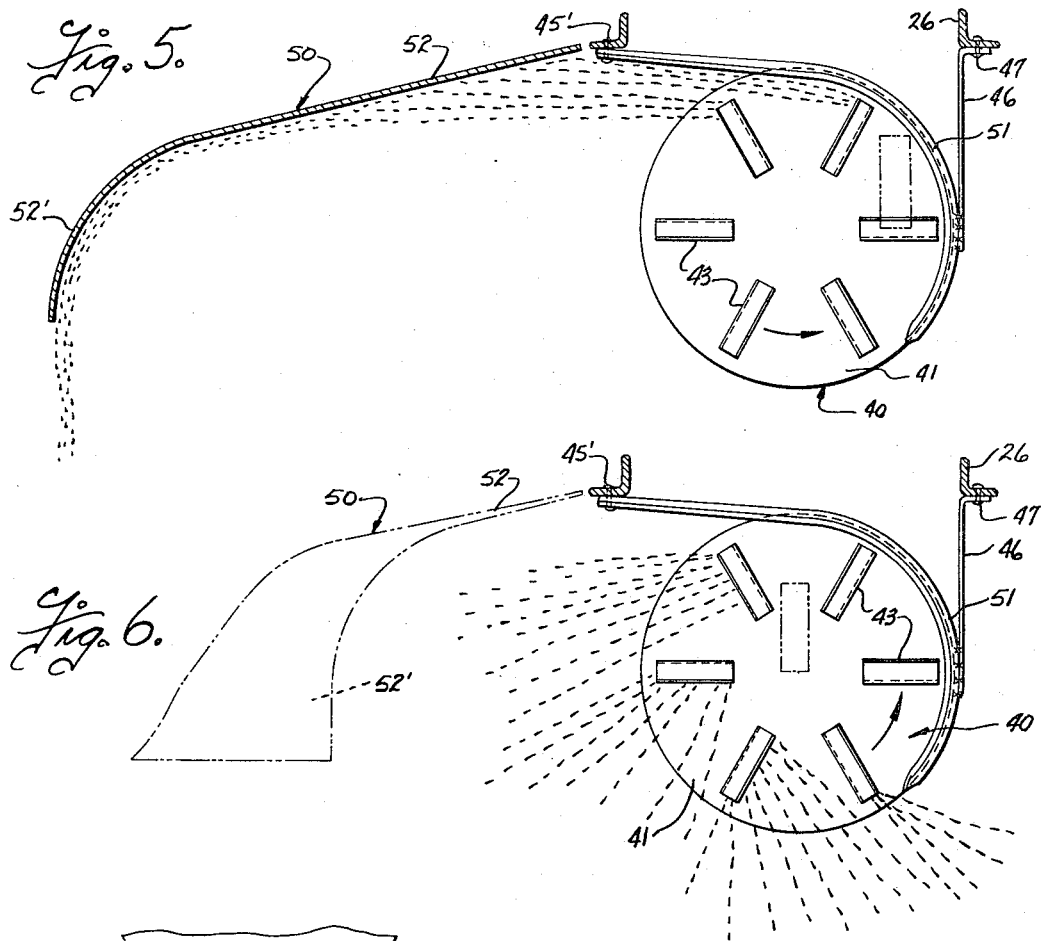
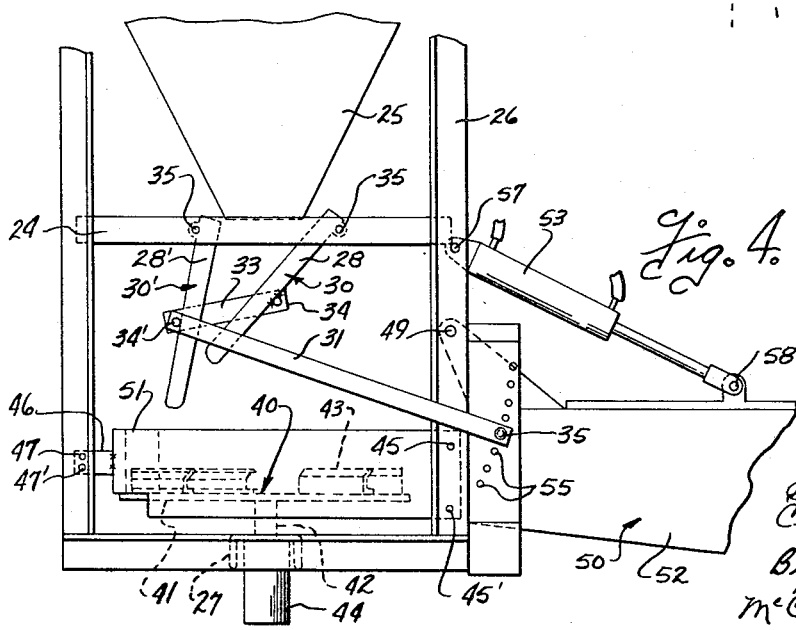

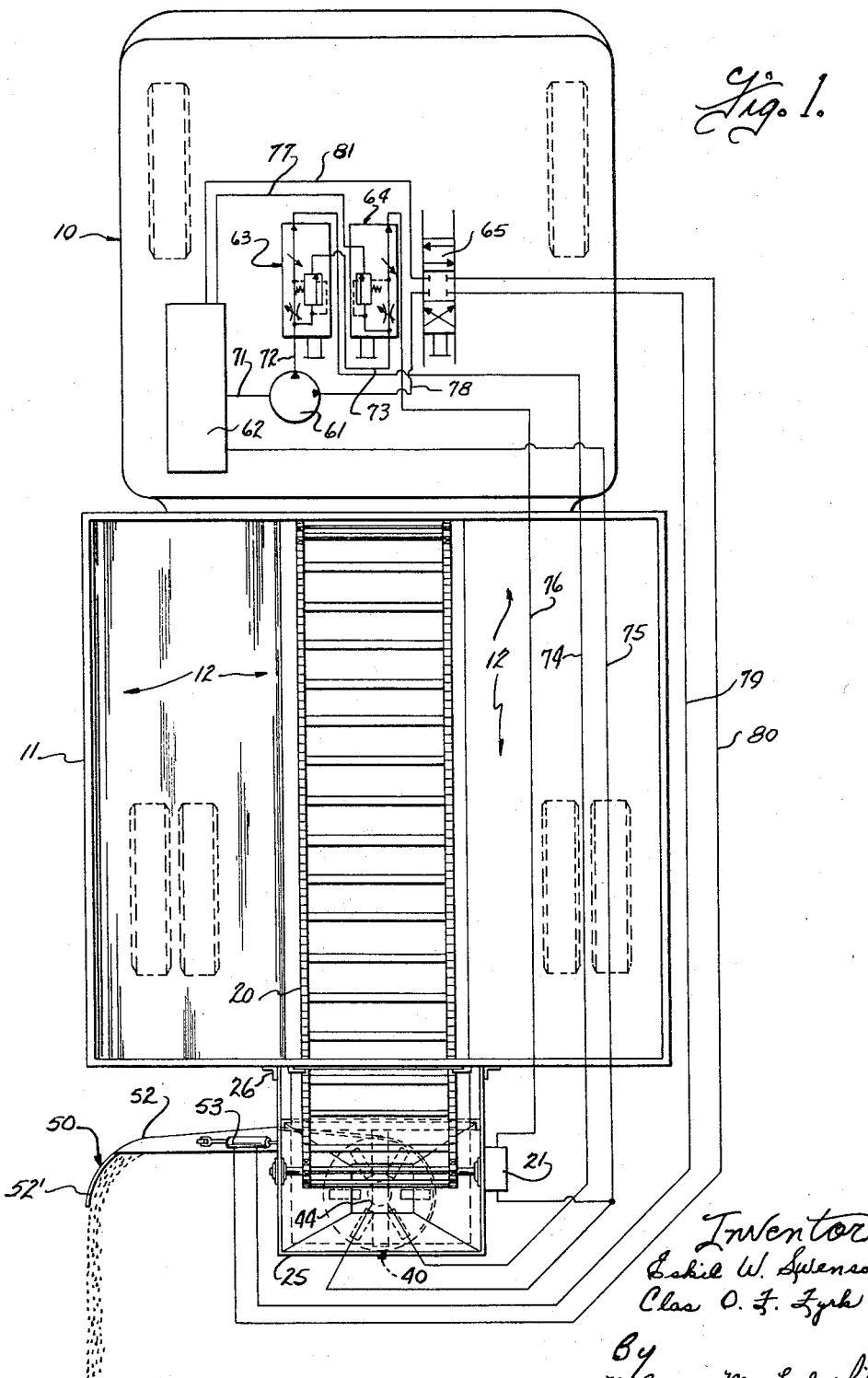

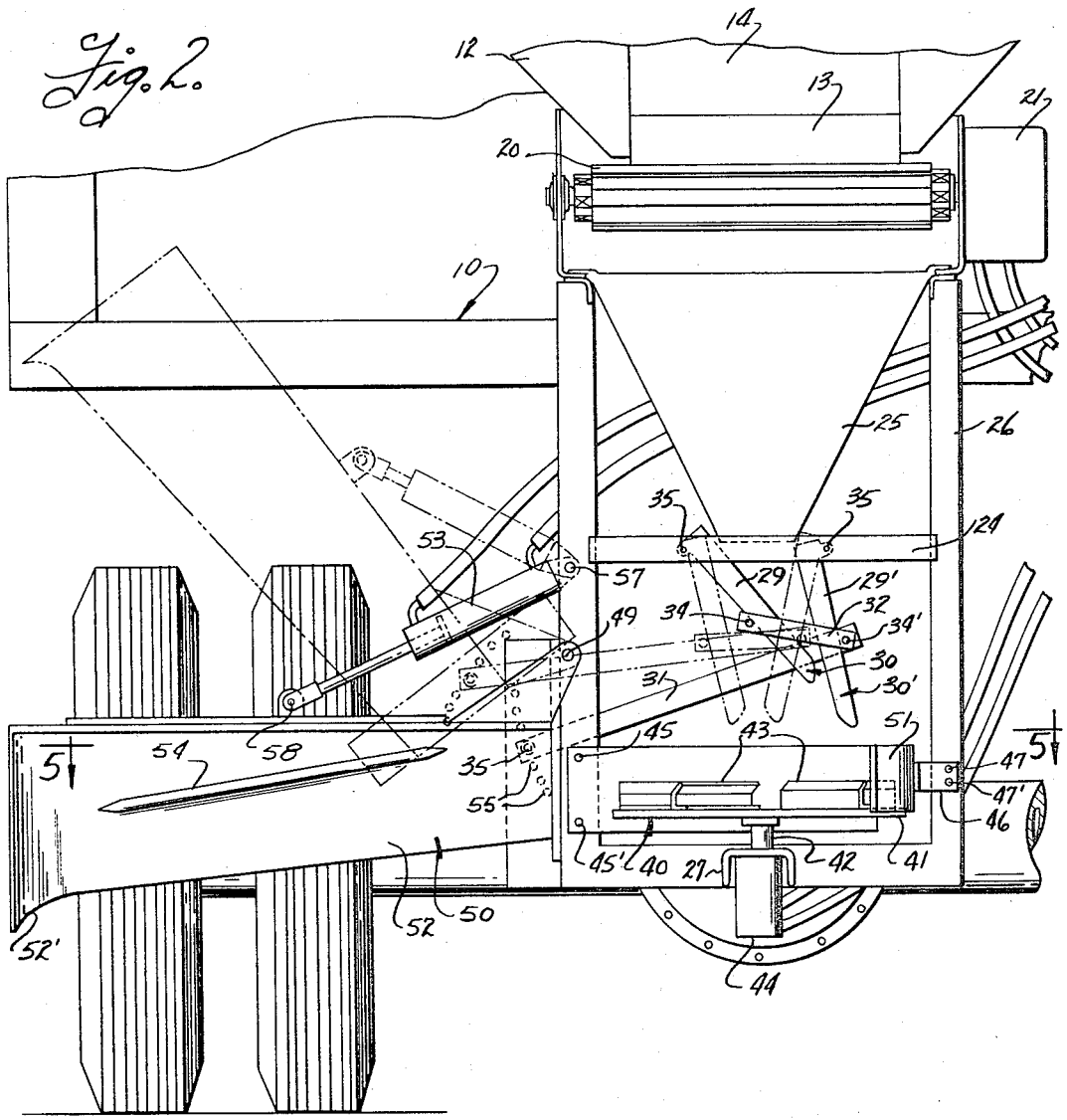

3,332,691
SPREADER APPARATUS
Eskil W. Swenson, Cherry Valley, and Clas O. F. Fyrk, Rockford, Ill., assignors to Swenson Spreader & Mfg. Co., Lindenwood, Ill., a corporation of Illinois
Filed Nov. 18, 1964, Ser. No. 412,105
16 Claims. (Cl. 275—8)

This invention relates to improvements in trucks having apparatus for spreading chemicals, grit and the like, and particularly to an apparatus adaptable for spreading the material in a substantially narrow strip.

In the spreading of chemicals and grit such as sand, cinders, salt and the like, hereinafter sometimes referred to as particulate material, it is frequently desirable to be able to spread particulate material in a relatively narrow strip along the centerline of the road. Indeed, there are many counties in the snow belt in the United States which require that a spreader attachment be able to accomplish this result. It is an object of this invention to provide a relatively simple attachment, with a minimum of moving parts, which is operative to spread the particulate material in a substantially narrow strip along the side of the truck.

In spreading chemicals, grit and the like on highways, excellent results have been obtained with an ordinary spinner or rotary type broadcast spreader when it is desired to spread the material over the entire width of roadway. Thus, another object of this invention is to provide an attachment which may be used with a rotary type broadcast spreader whereby the spreader may be converted to spread material along a relatively narrow strip, and which attachment may be moved to an inoperative position to allow the broadcast spreader to be operated in its ordinary manner.

Another object of this invention is to provide a convertible attachment in accordance with the preceding object in which the location of deposit of material on the spinner disk may be changed automatically to a preselected location when the attachment is moved to an inoperative position to adapt the spreader for broadcast spreading.

Another problem presents itself when material is dropped from a moving truck. When this is done the material has a forward velocity approximately equal to the velocity of the moving truck and the material tends to bounce along following the truck causing an erratic spread of material. It is a further object of this invention to discharge the material in a confined stream and in a direction opposite to the forward direction of the truck thereby depositing the material on the ground in a relatively confined strip.

Another object of this invention is to control the speed of the spinner so that the rearward discharge velocity of the confined stream of material approximates the forward velocity of the truck.

Another object is to control the quantity of material fed to the spreader so that the quantity of material spread on the highway is also controlled.

Yet another object of this invention is to provide a truck having a material spreading apparatus in accordance with the foregoing objects, in which controls for the speed of the spinner, the quantity of the material fed, and the movement of the attachment between operative and inoperative positions may be remotely regulated by the vehicle operator from within the cab of the truck.

These, together with various ancillary objects and advantages of this invention will be more readily understood by reference to the following detailed description and the accompanying drawings wherein:

FIGURE 1 is a top view of a truck having a hopper for receiving material to be spread and the spreader apparatus of the present invention mounted thereon, and containing a diagrammatic view illustrating the control circuits for the spreading operations;

FIG. 2 is a rear view of the spreader apparatus mounted on a truck;

FIG. 3 is a side view of the spreader apparatus;

FIG. 4 is a partial view of the front side of the spreader apparatus taken along plane 4—4 of FIG. 3;

FIG. 5 is a horizontal sectional view of the spinner disk conversion apparatus taken on the plane 5—5 of FIG. 2 and illustrating the manner in which the trajectory of discharged material is guided to the desired point of deposit; and FIG. 6 is a top view of the spinner disk and illustrating in phantom the position of the material directing means and the material guide means when the latter is in its inoperative position to allow the spinner disk to be operated as an ordinary type broadcast spreader.

The truck, designated generally by the numeral 10, is of conventional construction and has a material receiving box or hopper 11 mounted at the back end of the truck. The box or hopper 11 may be of any suitable type and, as illustrated herein, is of the V-box type which is adapted to receive particulate material such as salt or sand. In general, the box 11 illustrated has sides 12 sloping toward the centrally located feeder mechanism 20. This feeder mechanism is conveniently in the form of a conveyor located within the box 11 at the base of the V-shaped sides 12 thereof. The conveyor may be of any construction which will feed material at a rate correlative with the speed at which the conveyor is driven. In the embodiment illustrated, the conveyor is of the endless type; however, it is contemplated that other types of conveyors could be used for delivering material through the discharge opening 13, for example, a screw type conveyor. The conveyor may be conveniently driven by means of a fluid motor 21, for example, of the gear, vane or gerotor type. The conveyor 20 is mounted to convey material longitudinally of the truck through a discharge opening 13 adjacent one end of the truck box. The size of the discharge opening 13 may be controlled by adjusting a gate 14 mounted on the box 11. While the conveyor 20 is herein shown arranged longitudinally of the truck, it is contemplated that the present invention is also adapted for use with different dump boxes and feed conveyor arrangements. The conveyor 20 dumps the particulate material into a material directing means for directing the material onto a broadcast type spreader, and the spreader and directing means are advantageously adjustable relative to each other to vary the location at which the material is deposited on the spinner and thus change the spread pattern. In the embodiment illustrated herein, the directing means includes a funneled receptacle 25 which is disposed beneath the conveyor and mounted on the rear end of the truck 10 by means of a frame 26. At the lower extremity of the receptacle 24 are a plurality of chutes 30 and 30' for directing the material onto the spreader 40. Provision is made for adjusting the chutes and spreader relative to each other to vary the spread pattern and, in the embodiment illustrated, the chutes are adjustable for directing the material on different areas of the spreader 40. As shown, the chutes are swingably mounted by a plurality of bolts 35 on a transverse structure 24 attached to the frame 26. Each of the chutes 30 and 30' is generally shaped like a channel with a flat, tapering wall 27 and inwardly extending side walls 28 and 29 as best shown in FIG. 3. The chutes are interconnected for simultaneous movement by bars 32 and 33 disposed on either side of the chutes and attached to the chutes by rods 34 and 34' which are welded to the backs of their respective chutes. One of the rods 34' is also connected to an actuating link 31. In this manner, the parts are interconnected so that the chutes will automatically move to a new position, such as the one indicated in phantom in FIG. 2 when the actuating link 31 is moved.

The spinner or broadcast type spreader, generally designated by the numeral 40, is of the type which generally throws the material fed thereto outwardly over the roadway area. Such broadcast spreaders are well known and in general include a disk or plate 41 mounted for rotation about a generally upright axis 42. There is a plurality of vanes 43 mounted on the disk 41 for engaging and throwing the material outwardly as the disk is rotated. In the embodiment illustrated, the broadcast spreader 40 is mounted centrally at the rear end of the truck 10, but it should be understood that the broadcast spreader could be mounted at different locations on the vehicle. The spreader 40 is conveniently driven in a counterclockwise direction by a positive displacement type hydraulic motor 44, for example of the gear, vane or gerotor type, and which motor is mounted on an arm 27 extending from the frame 26.

When the particulate material is deposited generally at the front center of the disk 41, as shown by the area outlined in phantom in FIG. 6, the spinner 40 will tend to operate as an ordinary type broadcast spreader. When, however, the material is deposited near the one side of the disk, as illustrated by the area outlined in phantom in FIG. 5, there is a tendency for the material to be impelled toward the front of the disk, which, in the embodiment illustrated, is back toward the truck. A guide means generally designated by the numeral 50, is provided to guide the trajectory of the material crosswise of the truck 10 and then in a rearward direction to deposit it in a substantially narrow strip at the side of the truck, as best indicated in FIG. 1. The guide means is arranged for movement between an operative guiding position in which it guides the trajectory of the material into the aforedescribed narrow strip and an inoperative position in which it does not interfere with broadcast spreading over a wide area. As shown, the guide means 50 comprises a stationary portion 51 and a movable portion 52. The stationary portion is conveniently in the shape of a wall around a portion of the spinner disk 41 and an arm extending generally tangentially outwardly. For efficient operation, the wall conveniently extends above the disk a distance greater than the height of the vanes 43 and extends around the disk a distance sufficient to retain generally all of the material on the disk when deposited substantially within the area outlined in phantom in FIG. 5. The stationary portion 51 is conveniently in relatively close relationship to the disk 41 or otherwise operates to maintain nearly all of the particulate material on the disk to the point of discharge at the front of the disk. The stationary portion 51 may be held in such relationship to the disk 41 in any convenient manner and, as shown, is mounted on the frame 26 by means of bolts 45 and 45' and by an angle iron 46 which is held by bolts 47 and 47'. The movable portion 52 is, in one position thereof, an extension of the stationary portion 51 and extends outwardly, crosswise of the truck 10 and has an outer end portion 52' that curves in a rearward direction from the truck with its terminal end disposed in a plane generally parallel to and adjacent the side of the truck as is best shown in FIG. 1. The movable portion 52 is pivotally mounted to the frame 26 about a generally horizontal axis 49. It is contemplated that the stationary portion 51 may also be made movable, either with or independent of the movable portion 52; however, this is not required.

It should now be understood that when the movable portion 52 is in said one position, as illustrated in FIGS. 1 through 5, it operates, in conjunction with the stationary portion 51, to guide the trajectory of the material generally crosswise of the truck 10 and thence in a rearward direction relative to the truck. Of course, this occurs only when the material is directed by the chutes 30 so that it is deposited on the spreader 40 approximately in the area outlined in phantom in FIG. 5. It should be noted that, when this is done, the material is ejected from the spreader in a relatively confined stream thus allowing it to be deposited on the ground in a generally narrow strip. The guide means is also advantageously shaped to confine the trajectory of the material in a vertical direction to concentrate the stream of material and, as shown, the movable means 52 has a baffle 54 attached thereto for the purpose of further confining the flow of material.

As has been previously indicated, the movable portion 52 may be moved from the above described one position to a second position indicated in phantom in FIGS. 2 and 6. This movement is conveniently accomplished by means of a hydraulic lifter 53 herein shown in the form of a piston and cylinder. The hydraulic lifter is swingably connected at one end to the frame 26 about a pin 57 and at the other end to the movable portion 52 about a pin 58. The manner in which this hydraulic lifter is operated, in this embodiment, will be described infra. It is also contemplated that this repositioning may be done by other mechanical means or manually. One end of the actuating link 31 is swingably joined to the movable portion 52 by a bolt 35 and, as previously described, the other end is joined to the rod 34' on chute 30'. When the movable portion 52 is moved from said one position to the second position indicated in phantom in FIG. 2, the actuating link 31 cooperates to simultaneously move the directing chutes 30 and 30' to a second position over the spreader 40. In order to enable selective variation of the broadcast spread pattern, provision is made for adjusting the "second" position to which the material directing chutes are moved when the guide means is moved to its second or inoperative position. In the present embodiment, a plurality of holes 55 have been provided in the movable portion 52 of the guide means for receiving the link attaching bolts 35 whereby the directing chutes 30 and 30' may assume various different positions over the spreader 40 when the deflecting portion 52 is moved to said second position. As will be seen from FIG. 2, the holes 55 are disposed in an arc approximately concentric with the pin or bolt 34' on the directing chutes when the guide means 52 is in its lowered position. Accordingly, adjustment of the end of the actuating link 31 in the holes 55 will not change said one position of the material directing chutes when the guide means is in its lowered or operative position. However, the holes 55 are disposed at different radial distances from the pivot pin 49 of the guide means to vary amplitude of movement of the link 31 and chutes in response to movement of the guide means from its operative to its inoperative position. When the link attaching bolt 35 is in its position in the mid one of the holes 55, as shown in FIG. 2, the chutes will be moved to deposit the material adjacent the center of the spreader as shown in phantom in FIG. 6. Adjusting the pin 35 up or down in the holes 55 will shift the "second position" of the chutes respectively to the left and right of the position shown in FIG. 6. In this manner, the material may be deposited in any one of various positions on the spreader which may be selected with the result that the material will be spread in any one of the various spread patterns.

Reference is now made more specifically to the control circuits diagrammed in FIG. 1. These circuits control the operation of the hydraulic motor 21 on the conveyor 20, the hydraulic motor 44 on the spreader 40, and the hydraulic lifter 53 which controls movement of the deflecting portion 52 of the guide means 50. The hydraulic control circuits for the conveyor and spreader are conveniently of the type disclosed in Patent No. 3,113,784 to Swenson et al. and reference is hereby made to that patent for a more complete disclosure and description of the control circuit. In general, the hydraulic control circuit includes a pump mechanism 61 which pumps fluid out of the reservoir 62 through a conduit 71. The pump mechanism 61 may be conveniently driven from the truck engine (not shown) at a speed that varies with the speed of the engine.

It is contemplated that the pump may be driven by an independent motor, but such is not required. The pump may be connected to the truck engine by belts or to the power take off shaft of the engine or the like. The pump 61 is conveniently connected through a conduit 72 to a first selector valve 63 of the pressure compensated flow control type. As diagrammatically illustrated, the first valve 63 has a by-pass outlet connected to the inlet end of a second pressure compensated selector valve 64 by means of a conduit 73 and a flow controlled outlet connected through conduit 74 which carries flow to the hydraulic spreader motor 44. The second valve 64 is also of the pressure compensated flow control type with a by-pass outlet which returns by-passed fluid to the reservoir and a flow controlled outlet connected through a conduit 76 to the hydraulic conveyor motor 21. Fluid is returned from the motors 44 and 21 to the reservoir 62. These pressure compensated flow control valves have an adjustable orifice for controlling flow from their inlet to their flow controlled outlet and a pressure operated valve mechanism responsive to the pressure differential across the orifice to regulate flow through the by-pass outlet to maintain a constant pressure drop across the orifice and hence a constant rate of flow determined by the orifice setting. These valves control the flow to their respective motors, hence the speed of the motors can be regulated by manual controls to the valves, as indicated in the diagram. In this embodiment, the valves and their controls are generally located in the cab of the truck, but it is contemplated that they can be located separately or in any manner convenient.

From the foregoing, it is deemed apparent that the valves 63 and 64 can be conveniently adjusted from the vehicle cab and while the vehicle is in motion to selectively and individually vary the speed of the motors operating the spreader 40 and the feed mechanism 20. Thus, by referring to a calibration chart within the cab, the density of the material spread for any given vehicle speed can be regulated to suit varying road conditions and without the necessity for interrupting the spreading operation. Likewise, by referring to a separate chart within the cab, the velocity of the material ejected from the spinner 40 can be regulated to approximate the speed of the truck 10. In this manner as best illustrated in FIG. 1, the particulate material may be ejected from the end of the deflecting portion 52 in a direction opposite to the forward movement of the truck and with a rearward velocity approximating the forward velocity of the truck. Thus, the resulting velocity of the material, in regard to the ground, would approximate zero, with the resulting advantage that there is a minimum amount of scattering of the material when deposited.

In addition to the aforementioned circuits, there is a fluid circuit to the hydraulic lifter 53. Fluid is conveniently pumped from the same reservoir 62 by the same pump 61. It is contemplated that a separate reservoir and pump may be used but that is not required. A conduit 78 conveniently connects the pump to a three-position four-way valve 65. Two conduits 79 and 80 lead from the valve to the hydraulic lifter 53 and another conduit 81 leads from the valve to the reservoir 62. As diagrammatically shown, the valve is regulated by manual controls so that, in one position, the valve allows flow to the lifter 53 so that it raises the movable portion 52; in another position the flow is reversed so that the movable portion is lowered; and, as illustrated, there is a third, no-flow position for the valve in which the movable portion 52 is locked in position. In this embodiment, the valve 65 is conveniently located in the cab to allow selection of spread patterns as the road conditions warrant and while the vehicle is in motion. As with the selector valves 63 and 64, however, the valve and its controls may be located in any convenient manner.

While we have thus described and illustrated a specific embodiment of our invention, this has been done by way of illustration and not limitation, and we do not wish to be limited except as required by the scope of the appended claims.

We claim:

1. In combination, a truck, a hopper on the truck for receiving material to be spread, a spinner type spreader mounted for rotation about a generally upright axis, means for directing flow of material from the hopper onto a preselected area of the spreader such that the material is thrown by the spreader substantially crosswise of the truck, and guide means extending generally tangentially to the spreader crosswise of the truck and curving rearwardly of the truck to a terminal end spaced from the spreader for guiding the trajectory of substantially all of said material from the spreader in a confined stream substantially lateral to said truck and in a rearward direction opposite the direction of forward movement of the truck to compensate for the forward velocity of the truck whereby the material is deposited on the ground in a substantially narrow strip and with a forward velocity substantially less than the forward velocity of the truck.

2. The combination of claim 1 including means for shifting the directing means and the spreader relative to each other to direct the flow of material onto different areas of the spreader whereby the spread pattern may be changed.

3. A spreader apparatus for use with a truck having a hopper for receiving material to be spread, the spreader apparatus comprising a spinner type broadcast spreader mounted for rotation about a generally upright axis, means for directing material from the hopper onto the spreader, the spreader and directing means being shiftable relative to each other for depositing material on different areas of the spreader, guide means operative in one position thereof for guiding the trajectory of substantially all of the material from the spreader in a confined stream directed opposite the direction of forward movement of the truck to compensate for the forward velocity of the truck whereby to deposit the material on the ground in a narrow strip, said guide means being movable away from said one position, and cooperative means for shifting the relative position of the spreader and directing means when the guide means is moved away from said one position to thereby change the spread pattern.

4. In a spinner type spreader apparatus having a plurality of vanes affixed to a disk which is mounted for rotation about a generally upright axis for use on a truck having a material hopper for receiving material to be spread and feed means for feeding material from the hopper to the spreader, the combination with said spinner type spreader of guide means for guiding the trajectory of said material generally crosswise of the truck and thence in a rearward direction relative to the truck; said guide means comprising a wall projecting above the spinner disk a distance greater than the height of said vanes of the spinner and extending around a portion of the spinner disk from a discharge point adjacent the front of said disk in a direction opposite to the direction of rotation of said disk a distance sufficient to retain substantially all of said material deposited on said disk until said material can be propelled to said point of discharge from said disk, and a portion extending from said discharge point generally crosswise of the truck and thence curving rearwardly relative to said truck with the terminal end of said portion generally adjacent one side of said truck whereby the material is ejected from said terminal end in a rearward direction from said truck and whereby the material is deposited on the ground in substantially narrow strip.

5. The combination of claim 4 including means for adjusting the speed of said spinner whereby the velocity of the material when ejected rearwardly compensates for the forward velocity of the truck and whereby the material may be deposited on the ground with a resulting forward velocity substantially less than the forward velocity of the truck.

6. The combination of claim 5 including means for adjusting the speed of said feed means whereby the quantity of material deposited may be controlled independent of the speed of the truck.

7. In a spinner type spreader apparatus mounted for rotation about a generally vertical axis for use on a truck having a material hopper for storing material to be spread on a highway and feed means for feeding said material from the hopper to the spreader, the combination with said spinner type spreader of direction means for directing the flow of the material from the feed means to an area of the spreader whereby the material is discharged substantially crosswise of the truck, and guide means for containing the material on the spreader until reaching the point of discharge and for guiding the trajectory of the material crosswise of the truck and thence in a rearward direction whereby the material is ejected in a direction opposite to the direction of forward movement of the truck and with a resulting forward velocity substantially less than the forward velocity of the truck and whereby the material is deposited on the highway in a substantially narrow strip.

8. The combination of claim 7 including means for changing the relative position of the direction means and the spreader to direct the deposit of the material on different areas of the spreader to discharge the material at additional points than crosswise of the truck and thereby effectuate a change in spread pattern.

9. In a spinner type broadcast spreader mounted for rotation about a generally upright axis for use on a truck having a material hopper and feed means for feeding material from the hopper to the spreader, the combination with said spinner type spreader of directional means for directing flow of material to the spreader, guide means operative in one position for guiding substantially all of the material discharged from the spreader in a confined stream in a direction substantially rearwardly of the truck whereby the material is deposited in a substantially narrow strip, said guide means in said one position extending outwardly from a point adjacent the forward periphery of the spreader in a direction laterally and rearwardly of the truck to a terminal end laterally spaced from the spreader a substantial distance, and means for adjusting the position of said guide means whereby said guide means is movable from said one position to allow said spreader to be operated as an ordinary spinner type broadcast spreader.

10. In a spinner type broadcast spreader mounted for rotation about a generally upright axis for use on a truck having a material hopper and feed means for feeding material from the hopper to the spreader, the combination with said spinner type spreader of directional means for directing flow of material to the spreader, guide means extending outwardly from the spreader and operative in one position for guiding the trajectory of substantially all of the material discharged from the spreader in a confined stream in a direction substantially rearwardly of the truck whereby the material is deposited in a substantially narrow strip, said guide means being movable away from said one position, and means operatively connected to said directional means and to said guide means for adjusting the position of said directional means when the guide means is moved, said last-mentioned means arranged to deposit said material on one area of the spreader when the guide means is in said one position for strip spreading and to deposit said material on a different area of the spreader when said guide means is moved out of said one position for broadcast spreading.

11. In combination with a truck having a hopper for receiving material to be spread, a spinner type spreader mounted for rotation about a generally upright axis; feed means for feeding material from the hopper to the spreader; means for directing the flow of such material onto a preselected area of the spreader such that the material is thrown by the spreader substantially crosswise of the truck; guide means extending in one position from adjacent the spreader crosswise of the truck and thence curving rearwardly of the truck for guiding the trajectory of substantially all of the material in a rearward direction and in a confined stream whereby the material is deposited in a substantially narrow strip, said guide means movable away from said one position; and cooperative means operative for adjusting the relative position of the spreader and said directional means to deposit said material on different selected portions of the spreader to thereby change the spread pattern, said cooperative means including means simultaneously operative to reposition said guide means away from said one position and allow said spreader to be operated as an ordinary spinner type broadcast spreader.

12. In combination with a truck having a hopper for receiving material to be spread, a spinner type spreader mounted for rotation about a generally upright axis; feed means for feeding material from the hopper to the spreader; means for directing the flow of such material onto a preselected area of the spreader such that the material is thrown by the spreader substantially crosswise of the truck; guide means extending in one position from adjacent the spreader crosswise of the truck and thence curving rearwardly of the truck for guiding the trajectory of substantially all of the material in a rearward direction and in a confined stream whereby the material is deposited in a substantially narrow strip, said guide means movable away from said one position; means for adjusting the relative position of the spreader and said directional means to deposit material on different portions of the spreader to thereby change the spread pattern and for repositioning said guide means whereby said guide means is moved away from said one position to allow said spreader to be operated as an ordinary spinner type broadcast spreader; and remotely operable means for changing the relative position of the spreader and said directional means and for simultaneously changing the position of said guide means.

13. A spreader apparatus for use with a truck having a hopper for receiving material to be spread, the spreader apparatus comprising a spinner type broadcast spreader mounted for rotation about a generally upright axis, means for directing material from the hopper onto the spreader, the spreader and directing means being shiftable relative to each other, guide means operative in one position thereof for guiding the trajectory of substantially all of the material from the spreader in a confined stream directed opposite the direction of forward movement of the truck to compensate for the forward velocity of the truck and to deposit the material on the ground in a substantially narrow strip, said guide means being movable away from said one position to a second position to allow said spinner to be operated as an ordinary type broadcast spreader and cooperative means for shifting the relative position of the spreader and directing means when the guide means is moved from said one position to said second position, said cooperative means including means for adjusting the magnitude of the relative shifting between the spreader and directing means in response to said movement to deposit material on different areas of the spreader and thereby effectuate a change in spread pattern.

14. In a spinner type broadcast spreader apparatus having a plurality of vanes affixed to a disk mounted for rotation about a generally upright axis for use on a truck having a material hopper for receiving material to be spread and feed means for feeding material from the hopper to the spreader, the combination with said spinner type spreader of directing means operative in one position to direct the flow of the material from the feed means onto an area of the spreader whereby substantially all of the material is discharged substantially crosswise of the truck, said directing means including mounting means for movement of said directing means out of said one position to selectively direct the flow of material from the feed means onto various areas of the spinner to effectuate changes in spread patterns; guide means operative in one position for containing the material on the spreader until reaching a point of discharge adjacent the front of said disk and for guiding the trajectory of the material generally crosswise of the truck and thence in a rearward direction relative to the truck, said guide means comprising a wall projecting above the spinner disk a distance greater than the height of said vanes and extending around a portion of the spinner disk from said discharge point in a direction opposite to the direction of rotation of said disk a distance sufficient to retain substantially all of said material on said disk until said material is propelled to said discharge point, and a portion extending in one position from said discharge point generally crosswise of the truck and thence curving rearwardly relative to said truck with the terminal end of said portion generally adjacent one side of the truck whereby the material is ejected in a confined stream from said terminal end in a rearward direction relative to the truck and deposited on the ground in a substantially narrow strip, said portion including attaching means for movement of at least a section of said portion about a generally horizontal axis and out of said one position to a second position whereby the spreader may be operated as an ordinary spinner-type broadcast spreader; remotely operable means for moving said section between said one position and said second position; and connecting means for connecting said section to said directing means out of said one position when said section is moved from said one position, said operative means including means for selecting a second position to which said directing means will move when said section is moved to said second position and thereby select the area of deposit of the material onto the spreader to effectuate a selected spread pattern when the spreader is operated as an ordinary spinner-type broadcast spreader, and said operative means operative for simultaneously moving said directing means from said second position to said one position when said section is moved from said second position to said one position.

15. In a spreader apparatus for use on a truck having a material hopper for receiving material to be spread and feed means for feeding material from the hopper to the spreader, the combination of (a) a spinner-type broadcast spreader comprising a plurality of vanes affixed to a disk and mounted for rotation about a generally upright axis;

(b) a plurality of chutes including means mounting the same for movement to direct the material onto various areas of the spreader to effectuate changes in spread patterns, said chutes operative in one position to direct the flow of material onto the spreader whereby substantially all of the material is discharged substantially crosswise of the truck;

(c) a guide means operative in one position for containing the material to the spreader until reaching a point of discharge adjacent the front of the disk and guiding the trajectory of the material generally crosswise of the truck and thence in a rearward direction relative to the truck, said guide means comprising a wall projecting above the spinner disk a distance greater than the height of said vanes and extending around a portion of the spinner disk from said discharge point in a direction opposite to the direction of rotation of said disk a distance sufficient to retain substantially all of the material on said disk until said material is propelled to said discharge point, a portion extending in one position from said discharge point generally crosswise of the truck and thence curving rearwardly to said truck with the terminal end of said portion generally adjacent one side of the truck whereby the material is ejected in a confined stream from said terminal end in a rearward direction relative to the truck and deposited on the ground in a substantially narrow strip, and a means for mounting at least a section of said portion for movement about a generally horizontal axis and out of said one position to a second position whereby the spreader may be operated as an ordinary spinner-type broadcast spreader;

(d) a moving means comprising a cylinder, movable wall disposed inside said cylinder, a rod extending out of said cylinder, a hydraulic fluid container in said cylinder, control means for remotely activating said moving means for movement, means for connecting one end of said moving means to said movable section and the other end to the truck, stop means for limiting the movement of said moving means, and lock means for holding said moving means in the extremities of movement; and (e) an actuating link for simultaneously moving said chutes when said movable section is moved, said link comprising an elongated bar, means for connecting one end of said bar to said movable section and the other end to one of said chutes, means for interconnecting said chutes, and a plurality of positioning stops for selecting a second position for said chutes when said movable section is moved to its said second position and thereby select the area of deposit onto the spreader to effectuate a selected spread pattern when the spreader is operated as an ordinary spinner-type broadcast spreader.

16. In a spinner type spreader apparatus having a plurality of vanes affixed to a disk which is mounted for rotation about a generally upright axis for use on a truck having a material hopper for receiving material to be spread and feed means for feeding material from the hopper to the spreader, the combination of:

guide means for guiding the trajectory of the material laterally and rearwardly of the truck, said guide means including a wall projecting above the disk and extending around a portion of the periphery thereof from adjacent a discharge point adjacent the front of the disk and in a direction opposite the direction of rotation of the disk a distance sufficient to retain substantially all of the material deposited on the disk until the material can be propelled to the point of discharge, and a portion extending laterally outwardly of the disk from adjacent the discharge point in the direction of rotation, said portion curving rearwardly of the truck to a terminal end laterally spaced from the disk and so arranged that the material is ejected in a confined stream from the terminal end in a rearward direction relative to the truck.

References Cited

UNITED STATES PATENTS

| | | | |
|---|---|---|---|
| 2,506,658 | 5/1950 | White | 111—85 X |
| 2,856,191 | 10/1958 | Kolb | 275—15 X |
| 2,988,368 | 6/1961 | Kerr | 275—8 |
| 3,113,784 | 12/1963 | Swenson et al. | 275—8 |
| 3,191,944 | 6/1965 | Watts | 275—8 |

FOREIGN PATENTS 621,096 5/1927 France.

ABRAHAM G. STONE, *Primary Examiner.*

J. R. OAKS, *Assistant Examiner.*